(12) United States Patent
Sasaki et al.

(10) Patent No.: US 8,023,211 B2
(45) Date of Patent: Sep. 20, 2011

(54) LENS ASSEMBLY AND IMAGE-TAKING APPARATUS

(75) Inventors: Ryota Sasaki, Saitama (JP); Naoki Sasaki, Saitama (JP); Yuya Sakai, Saitama (JP); Yasunori Tanaka, Saitama (JP); Ikuo Taki, Odawara (JP)

(73) Assignee: Fujifilm Corporation, Tokyo (JP)

( * ) Notice: Subject to any disclaimer, the term of this patent is extended or adjusted under 35 U.S.C. 154(b) by 25 days.

(21) Appl. No.: 12/559,783

(22) Filed: Sep. 15, 2009

(65) Prior Publication Data
US 2010/0079879 A1   Apr. 1, 2010

(30) Foreign Application Priority Data
Sep. 30, 2008   (JP) ................................ 2008-254769

(51) Int. Cl.
*G02B 7/22* (2006.01)
(52) U.S. Cl. ........................................................ 359/822
(58) Field of Classification Search .................. 359/822
See application file for complete search history.

(56) References Cited

U.S. PATENT DOCUMENTS

| | | | | |
|---|---|---|---|---|
| 4,281,916 | A | * | 8/1981 | Aoyagi ........................ 396/298 |
| 5,502,588 | A | | 3/1996 | Kimua et al. |
| 5,523,815 | A | | 6/1996 | Tamura |
| 5,719,711 | A | * | 2/1998 | Shiba ............................ 359/819 |
| 5,781,351 | A | | 7/1998 | Murakami et al. |
| 5,864,739 | A | | 1/1999 | Kaneko et al. |
| 6,144,509 | A | * | 11/2000 | Baker ............................ 359/819 |
| 6,424,473 | B1 | | 7/2002 | Nakane et al. |
| 7,576,930 | B2 | | 8/2009 | Yu |
| 2001/0040740 | A1 | | 11/2001 | Funakoshi |
| 2004/0197038 | A1 | | 10/2004 | Fujita et al. |
| 2006/0162826 | A1 | | 7/2006 | Tsutsui |
| 2006/0204781 | A1 | | 9/2006 | Takei |
| 2007/0076308 | A1 | | 4/2007 | Shimizu et al. |
| 2007/0188699 | A1 | | 8/2007 | Cech et al. |
| 2007/0191209 | A1 | | 8/2007 | Hyuga et al. |
| 2008/0031103 | A1 | | 2/2008 | Horinouchi et al. |
| 2008/0055754 | A1 | | 3/2008 | Sakamoto |

(Continued)

FOREIGN PATENT DOCUMENTS
JP   1-243245   9/1988
(Continued)

OTHER PUBLICATIONS

Office Action dated Oct. 15, 2009 issued in co-pending U.S. Appl. No. 12/404,017.
JPO Notification issued in foreign counterpart application JP 2008-254769, dated Apr. 6, 2011.
Chen Jianmin et al., "Developing Situation and Application of Bonded Soild Lubricant Films", Tribology, vol. 14, No. 2. pp. 180-189 Apr. 1994.

(Continued)

*Primary Examiner* — Ricky L Mack
*Assistant Examiner* — Vipin M Patel
(74) *Attorney, Agent, or Firm* — Birch, Stewart, Kolasch & Birch, LLP

(57) ABSTRACT

A lens assembly includes a barrel having an object-side opening and an image-forming-side opening. The barrel further has a positioning section that positions an image-forming-side surface of a lens by having line contact around an optical axis at a center. The positioning section is disposed at a position that is closer to an object side than the image-forming-side opening of the barrel is. The barrel also has an image-forming section that extends from the positioning section to a center of the optical axis along the image-forming-side surface of the lens and forms an edge of the image-forming-side opening of the barrel.

8 Claims, 7 Drawing Sheets

U.S. PATENT DOCUMENTS

| | | |
|---|---|---|
| 2008/0070815 A1 | 3/2008 | Kamada et al. |
| 2008/0252775 A1 | 10/2008 | Ryu et al. |
| 2009/0103193 A1 | 4/2009 | Berube |
| 2009/0244726 A1 | 10/2009 | Sakai et al. |

FOREIGN PATENT DOCUMENTS

| | | |
|---|---|---|
| JP | 2000-357333 | 12/2000 |
| JP | 2001-027723 | 1/2001 |
| JP | 2002-23091 A | 1/2002 |
| JP | 2006-284991 A | 10/2006 |
| JP | 2006-292927 A | 10/2006 |
| JP | 2007-094242 | 4/2007 |
| JP | 2007-199235 | 8/2007 |
| JP | 2007-238430 A | 9/2007 |
| JP | 2007-279557 A | 10/2007 |
| JP | 2008-254771 A | 9/2008 |
| JP | 2008-254772 A | 9/2008 |
| JP | 2008-254773 A | 9/2008 |
| JP | 2008-254775 A | 9/2008 |
| JP | 2009-206117 A | 9/2009 |
| JP | 2008-88528 A | 10/2009 |
| JP | 2009-296542 | 12/2009 |

OTHER PUBLICATIONS

Chinese Office Action issued on Dec. 31, 2010 in chinese Patent Application No. 200910253004 X of co-pending U.S. Appl. No. 12/559,718.

Chines Office Action issued on Jan. 11, 2011 in Chinese Application No. 200910205755.4 corresponding to co-pending U.S. Appl. No. 12/559,699.

U.S. Office Action issued in co-pending U.S. Appl. No. 12/559,680 issued Dec. 27, 2010.

U.S. Office Action issued in co-pending U.S. Appl. No. 12/559,699 issued Dec. 29, 2010.

U.S. Office Action issued in co-pending U.S. Appl. No. 12/559,7180 issued Feb. 2, 2011.

Notice of Allowance issued in copending U.S. Appl. No. 12/559,699 dated May 25, 2011.

Notice of Allowance issued in copending U.S. Appl. No. 12/559,718 dated May 23, 2011.

* cited by examiner (a)
103B (b)
103C (c)
103D

LENS ASSEMBLY AND IMAGE-TAKING APPARATUS

BACKGROUND OF THE INVENTION

1. Field of the Invention

The present invention relates to a lens assembly equipped with an image-forming optical system and to an image-taking apparatus provided with the lens assembly.

2. Description of the Related Art

In recent years, automobiles have been provided with cameras. Meanwhile, nowadays, automobiles are equipped with display screens thanks to the widespread use of car navigation systems. Therefore, many of cameras installed in automobiles can display the state of a blind spot for a driver on a display screen provided in front of the driver's seat.

Incidentally, automobiles may be left outdoors in hot summer and in freezing winter and therefore, a camera installed in an automobile is required to operate properly over an extremely wide range of temperatures. In order to guarantee the proper operation of a vehicle-mounted camera, a lens assembly employed in such a camera needs to be not only lightweight and robust as generally required, but also resistant to stretching and shrinking with temperature for the purpose of preventing the occurrence of a blur due to a change in temperature. To meet these needs, ceramic barrels have been devised (see, for example, Japanese Patent Application Publications No. 2006-284991 and No. 2006-292927). Also, the inventors of the present application have proposed to apply porous ceramic to an optical component (see, for example, Japanese Patent Application Publication No. 2007-238430). The porosity of the porous body described in the specification of Japanese Patent Application Publication No. 2007-238430 is equal to or more than 10%.

However, the porous ceramic is prone to chip, which is a drawback that needs to be overcome.

Here, how such a drawback appears when the porous ceramic is used in a barrel will be described with reference to FIG. 1.

FIG. 1 is a diagram showing an example of the structure of a lens assembly to be applied to a vehicle-mounted camera, and FIG. 2 is a diagram for describing the state of a defect that has occurred at the time of assembling the lens assembly. Further, FIG. 3 is a diagram for describing the structure of a positioning section different from a positioning section shown in FIG. 1.

First, the structure of the lens assembly will be briefly described with reference to FIG. 1.

A lens assembly 1 illustrated in FIG. 1 is provided with a barrel 10, and the barrel 10 has a hollow part 100 having an object-side opening 101 and an image-forming-side opening 102. Formed on an object-side periphery of the barrel 10 is a male thread SR1. From the object-side opening 101, lenses L1 trough L4 and spacing rings SP1 through SP3 are inserted while being aligned along the optical axis. These elements L1 through L4 and SP1 through SP3 may be collectively referred to as optical members. In this example, as shown in FIG. 1, the lenses L1 trough L4 and the spacing rings SP1 through SP3 are alternately disposed and sequentially inserted into the hollow part 100 of the lens barrel 10.

Furthermore, the lens assembly 1 illustrated in FIG. 1 is provided with a pressing ring 11 that fixes the optical members L1 through L4 and SP1 through SP3 inserted into the hollow part 100 of the barrel 10, by pressing these optical members from the side where the object-side opening 101 is formed. The pressing ring 11 has: a mounting opening 110 into which an object-side part of the barrel 10 is inserted; and an optical opening 111 for making a central part of the lens L1 exposed. Among the optical members inserted into the barrel, the lens L1 is the one disposed at the position closest to the object. Formed on an inner wall on a mounting opening side of the pressing ring 11 is a female thread SR2 in which the male thread SR1 is engaged. When the male thread SR1 is engaged in the female thread SR2, the edge of an object-side surface of the lens L1 disposed at the position closest to the object on the object side is pressed by the pressing ring 11.

The lens assembly 1 shown in FIG. 1 is assembled by using the pressing ring 11 that presses the lenses L1 trough L4 and the spacing rings SP1 through SP3 in the barrel 10 toward the image-forming-side opening.

In the example shown in FIG. 1, the positioning section 103 positions an image-forming-side surface of the lens L4 disposed at the outermost position on the image-forming side, by having line contact around the optical axis at a center. The positioning section 103 is provided at a position in which the image-forming-side opening 102 is formed, so that the positioning section 103 can serve as a stopper for eliminating unwanted light. In other words, the positioning section 103 forms the edge of the image-forming-side opening 102. For this reason, the positioning section 103 is formed to have an acute angle in cross section including the optical axis, as illustrated in part (b) of FIG. 1.

Thanks to this structure, after the lens L4 located at the outermost position on the image-forming side is accurately positioned by the positioning section 103, the remaining lenses L1 through L3 are sequentially positioned by following the positioned lens L4. However, since the porous ceramic has such a drawback that it is liable to chipping as described above, the positioning section 103 illustrated in FIG. 1 may chip as well during assembly. Once such chipping occurs, not only the commercial value in view of the appearance is lowered, but also the quality of a shot image is reduced because incident light diffuses at a chip and a part of the incident light enters the shooting angle. In addition, such a chip may cause the lens L4 to lean without being precisely positioned, impairing the image.

FIG. 2 illustrates the state of a defect that has occurred when the porous ceramic is used for the barrel, and shows the state where many chips 1031 have appeared in the positioning section with the acute angle. In order to prevent these chips 1031 from being formed, it is conceivable to reinforce the positioning section. For example, a thick positioning section 103A can be formed by utilizing the technique of Japanese Patent Application Publication No. 2007-279557 as illustrated in FIG. 3. However, the positioning section 103A has such a drawback that subject light reflects at a portion 1031A and enters a shooting angle thereby lowering the quality of a shot image as in the case in which a chip is formed. For this reason, it is necessary to make the positioning section have an acute angle like the positioning section 103 illustrated in FIG. 1, while preventing a chip.

The drawback of the porous ceramic barrel has been described so far. However, even when a barrel is produced using ordinary non-porous ceramic, chipping may similarly occur, although this barrel may be stronger than the porous ceramic barrel. Alternatively, it is conceivable to employ a barrel made of, for example, plastic, by designing the barrel that can resist stretching and shrinking with temperature. The barrel made of plastic is free from a problem of a chip unlike the ceramic barrel. Instead however, the barrel made of plastic has such a drawback that when it is used as a material of the positioning section 103 illustrated in FIG. 1, the positioning section 103 is deformed when pressed by the lens L4, shifting the positions of the lens L4 as well as other lenses, thereby failing to realize the initial optical performance.

SUMMARY OF THE INVENTION

In view of the above circumstances, the present invention provides a lens assembly that prevents chipping and deformation of an opening section on an image-forming side, and also provides an image-taking apparatus incorporating such a lens assembly.

A lens assembly of the present invention includes:

a plurality of optical members forming an image-forming optical system and including a lens to be disposed on a side closest to an image-forming-side; and a barrel having an object-side opening, an image-forming-side opening, and a hollow part into which the plurality of optical members are inserted so that the lens is disposed on the side closest to the image-forming-side, the barrel further having:

a positioning section that positions an image-forming-side surface of the lens by having line contact around an optical axis at a center, and an opening forming section that extends from the positioning section to a center of the optical axis along the image-forming-side surface of the lens and forms an edge of the image-forming-side opening.

According to the lens assembly of the present invention, the image-forming-side opening is formed by the opening forming section that extends from the positioning section of the barrel to the center of the optical axis along the image-forming-side surface of the lens. Therefore, the positioning section is not provided with the acute angle in cross section including the optical axis shown in FIG. 1. In other words, the positioning section has a larger angle. As a result, a sufficient thickness of a part around the positioning section is ensured, increasing the strength of the positioning section.

In the lens assembly according to the present invention, preferably, the positioning section is formed to have an obtuse angle in cross section including the optical axis.

The more obtuse the angle of the position section in cross section including the optical axis is, the larger the thickness of a part having line contact is, making the position section stronger.

In the lens assembly according to the present invention, the positioning section may be formed to be in the shape of a convex arc bulging toward the lens in cross section including the optical axis.

The smaller the line width of the part having line contact is, the higher the positioning precision of the positioning section is. However, when high positioning accuracy is not required, the line width can be made larger. In other words, the positioning section may be in the shape of a convex arc bulging toward the lens, so long as a necessary degree of positioning precision allows.

In the lens assembly according to the present invention, when the image-forming-side surface of the lens is convex, the positioning section may have a part with a flat surface that contacts the lens.

When the image-forming-side surface of the lens is convex, the positioning section may be flat, eliminating the necessity to make the positioning section be in the shape of a convex arc.

In the lens assembly according to the present invention, the opening forming section may form the edge of the image-forming-side opening at a wedge-shaped tip with an obtuse angle in cross section including the optical axis.

As described above, subject light passing through the lens is required to further pass through the image-forming opening and then reach the imaging device without being blocked.

When the opening forming section is made to form the edge of the image-forming-side opening at a wedge-shaped tip with an obtuse angle in cross section including the optical axis, it is possible to prevent unnecessary light from being emitted from the image-forming-side surface of the lens to the imaging device, allowing only effective light to reach the imaging surface of the imaging device.

In the lens assembly according to the present invention, the barrel may be made of ceramic or porous ceramic.

Further, an image-taking apparatus of the present invention includes:

a lens assembly including:
 a plurality of optical members forming an image-forming optical system and including a lens to be disposed on a side closest to an image-forming-side, and
 a barrel having an object-side opening, an image-forming-side opening, and a hollow part into which the plurality of optical members are inserted so that the lens is disposed on the side closest to the image-forming-side, the barrel further having:
  a positioning section that positions an image-forming-side surface of the lens by having line contact around an optical axis at a center, and
  an opening forming section that extends from the positioning section to a center of the optical axis along the image-forming-side surface of the lens and forms an edge of the image-forming-side opening; and
an imaging device disposed at an image-forming surface of the image-forming optical system formed by the plurality of optical members of the lens assembly.

According to the image-taking apparatus of the present invention, since the lens assembly with no chip formed in the barrel is incorporated into the image-taking apparatus, preferable optical performance is realized.

DETAILED DESCRIPTION OF THE INVENTION

Embodiments of the present invention will be described.

Figure 1:
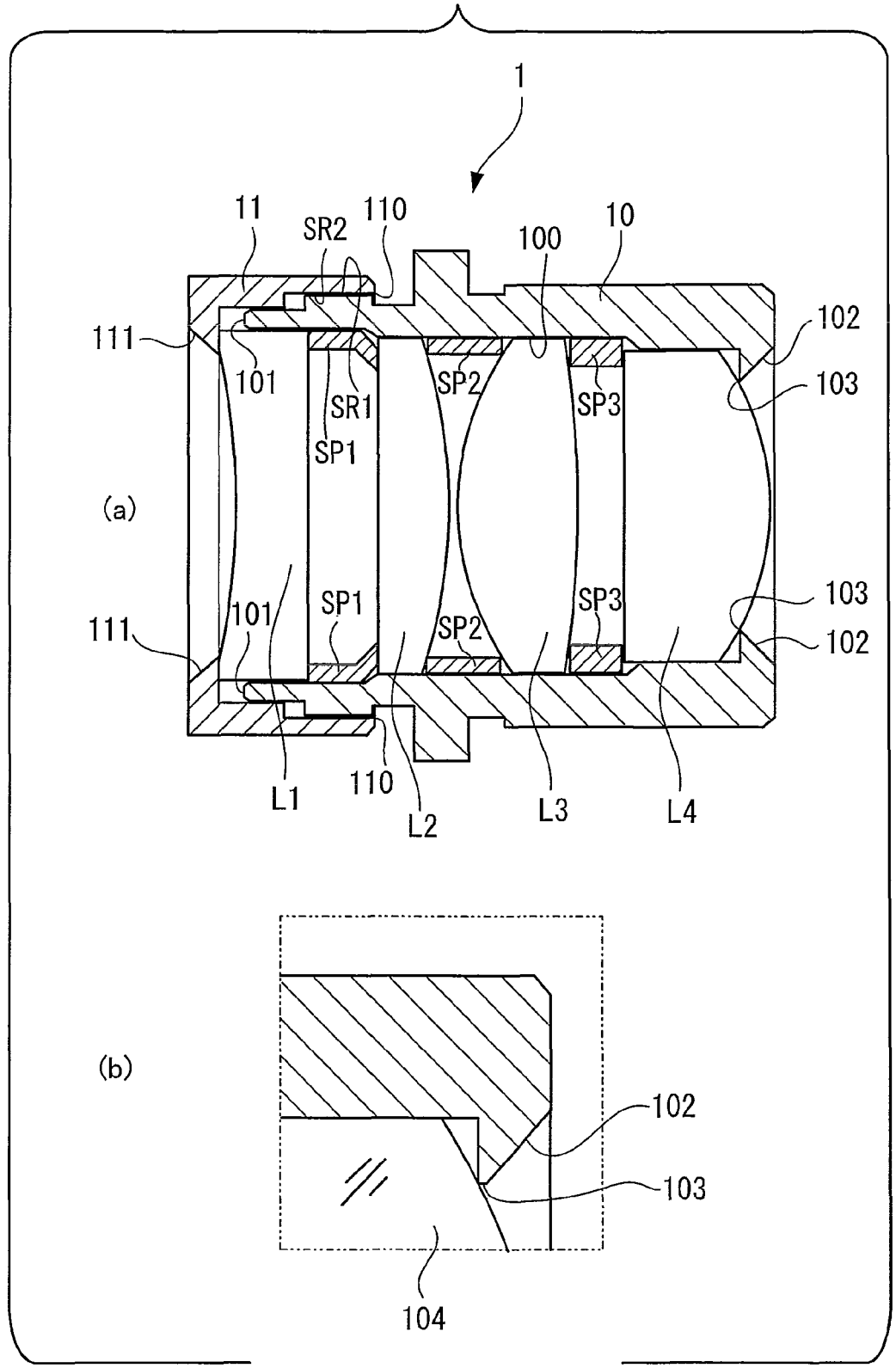
FIG. 1 is a diagram that shows a structure of a lens assembly to be applied to a vehicle-mounted camera and provided with a barrel in which a hollow part is formed.
Figure 4:
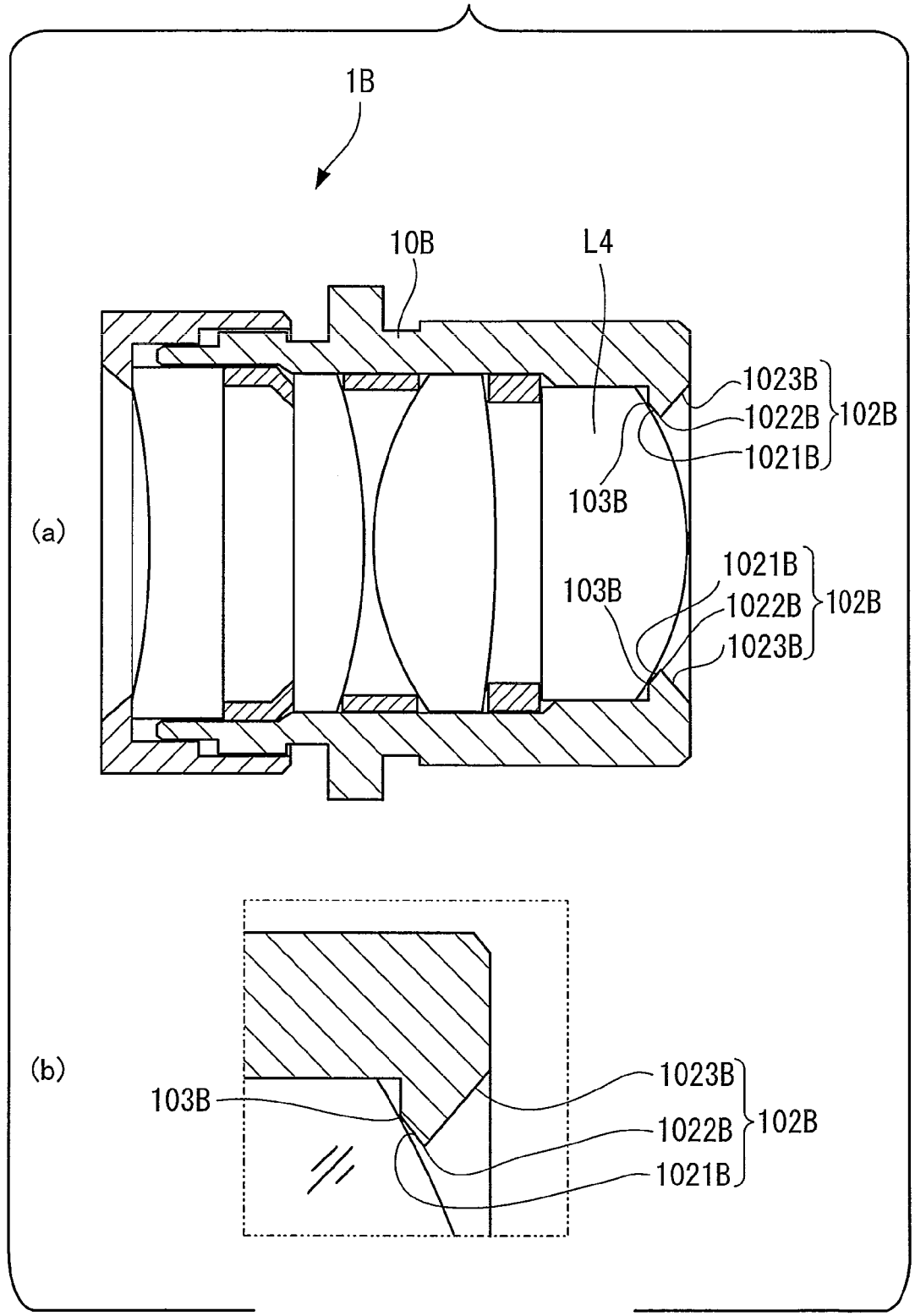
FIG. 4 is a diagram illustrating a lens assembly according to a first embodiment of the present invention.

FIG. 4 is a diagram illustrating a lens assembly 1B according to a first embodiment of the present invention. Part (a) of FIG. 4 shows a cross-sectional view of the lens assembly 1B, taken along a lens optical axis, while part (b) of FIG. 4 shows the structure of a positioning section 103B. FIG. 4 is the same as FIG. 1, except the structure of the positioning section 103B depicted in part (b) of FIG. 4. In the example shown in FIG. 4, porous ceramic is used to form a barrel of the lens assembly 1B.

The structure of the positioning section 103B shown in FIG. 4 will be described.

FIG. 4 shows a barrel 10B provided with the positioning section 103B that positions an image-forming-side surface of a lens L4 disposed at the outermost position on the image-forming side, by having line contact around the optical axis at a center. Unlike the conventional example shown in FIG. 1, the positioning section 103B shown in FIG. 4 is disposed at a position that is closer to the object side than to an opening on the image-forming side. Further, an opening forming section 102B with edge parts 1021B, 1022B and 1023B is provided. The opening forming section 102B extends from the positioning section 103B to the center of the optical axis along an image-forming-side surface of the lens L4. Among the edge parts of the opening forming section 102, the edge part 1022B forms an end of the edge part 1021B that extends toward the center of the optical axis. The edge part (end) 1022B defines the opening. The edge part 1023B is tapered and follows the edge part 1022B to extend in a direction toward the rear of the optical axis. Thanks to the tapered edge part 1023B, the length of the surface of a portion corresponding to the portion 1031A shown in FIG. 3 can be made shorter in the optical direction, reducing the amount of light that is reflected off this surface and thus adversely affects an image.

In this structure, the line contact part for positioning the lens L4 is formed to be obtuse rather than being acute, which reinforces the structure of the positioning section 103B, making the positioning section 103B resistant to chipping. Therefore, when pushed by a pressing ring 11 during assembly, the incidence of chip in the positioning section 103B is significantly reduced as compared to those of conventional ones.

Figure 5:
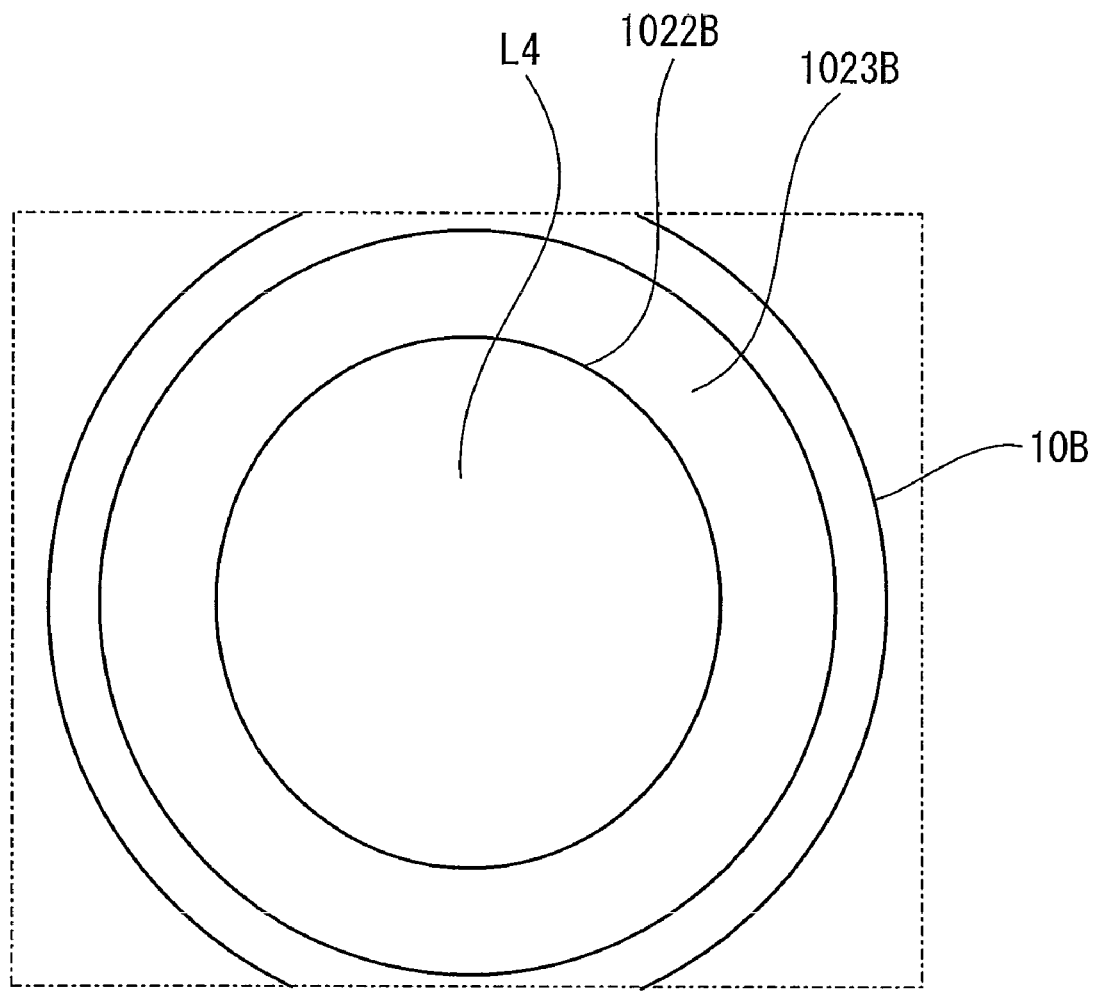
FIG. 5 is a diagram for describing an effect of the first embodiment.

FIG. 5 is a diagram for describing an effect of the present embodiment.

Figure 3:
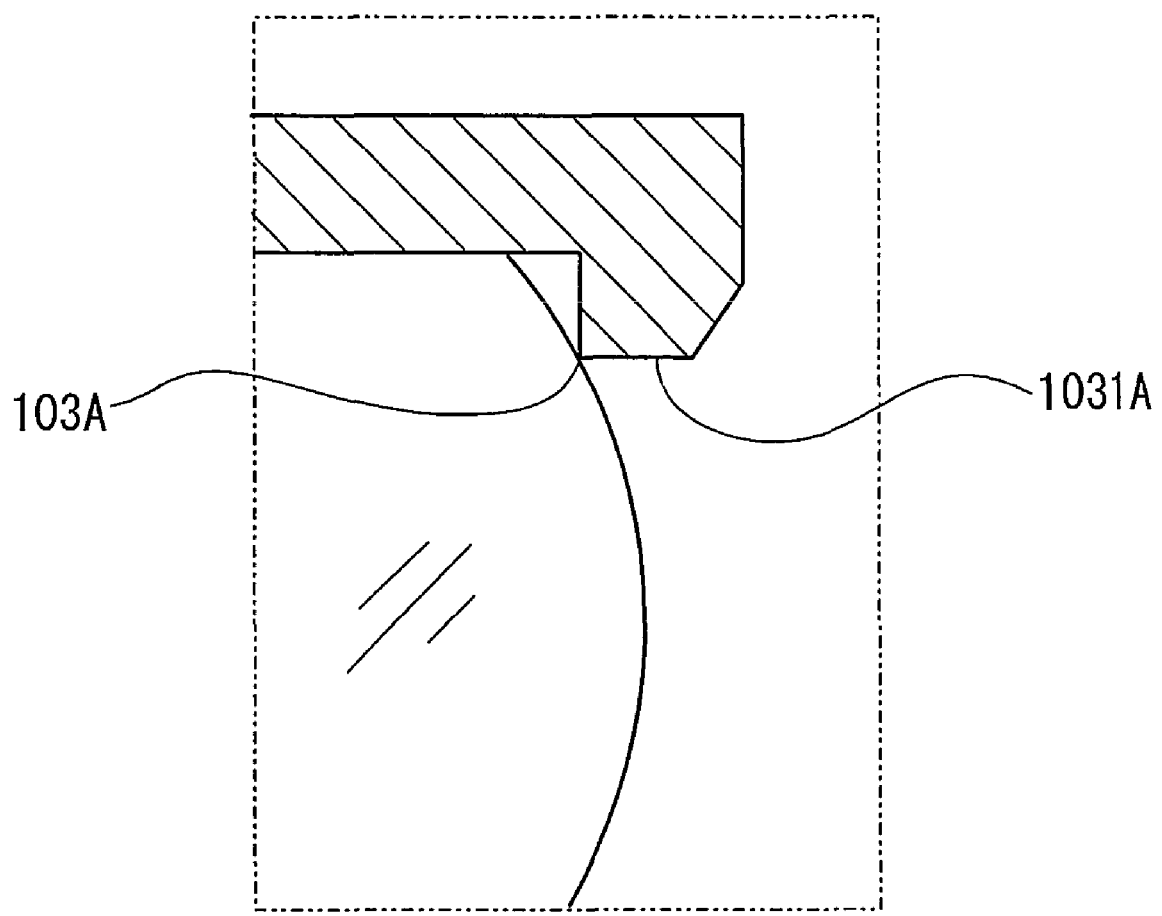
FIG. 3 is a diagram for describing the structure of a positioning section different from a positioning section shown in FIG. 1.

FIG. 5 illustrates, like FIG. 3, the inside of the barrel 10B after the assembly as viewed from the image-forming-side opening. FIG. 5 shows: the lens L4; and the edge part 1022B that forms the end of the edge part 1021B extending toward the center of the optical axis, among the edge parts of the opening forming section 102B shown in FIG. 4. FIG. 5 also shows the edge part 1023B tapered and extending from the edge part 1022B toward the image-forming side.

Figure 2:
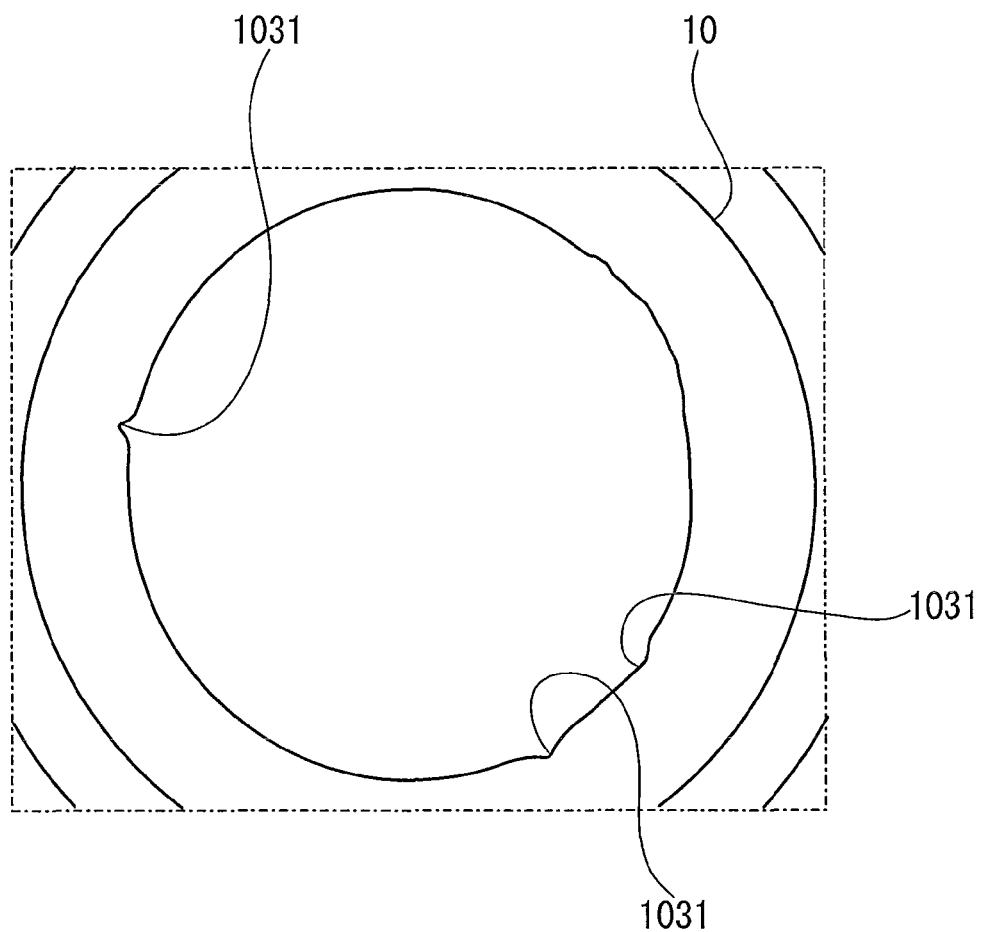
FIG. 2 is a diagram for describing the state of a defect that has occurred at the time of assembling the lens assembly.

As illustrated in FIG. 5, thanks to the structure of the present embodiment, the strength of the positioning section 103B is increased, thereby achieving an excellent assembled state with no chip unlike FIG. 2.

Here, the positioning section may employ other types of structures.

Figure 6:
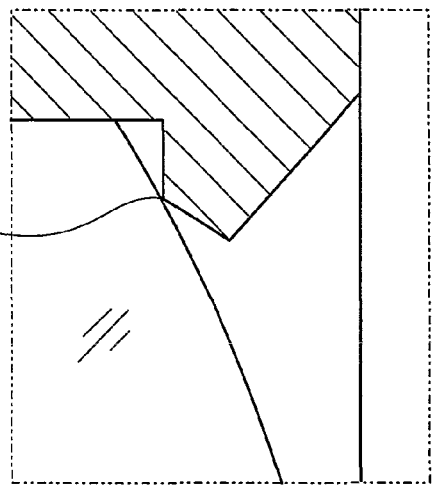
FIG. 6 is a diagram for describing a second and a third embodiments.
Figure 6:
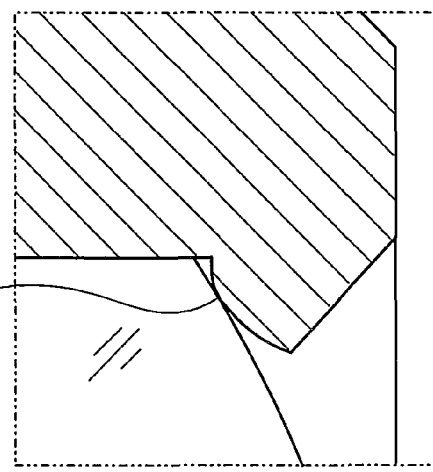
Figure 6:
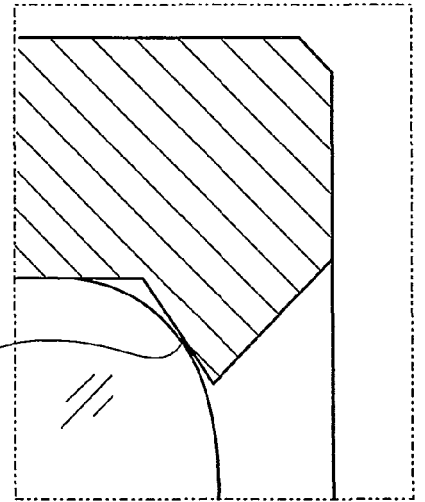

FIG. 6 is a diagram that shows various types of structures of the positioning section.

Part (a) of FIG. 6 is the same as part (b) of FIG. 4. Meanwhile, part (b) of FIG. 6 illustrates a second embodiment and part (c) of FIG. 6 shows a third embodiment.

Since the first embodiment shown in part (a) of FIG. 6 has been already described, the second embodiment will be described first with reference to part (b) of FIG. 6.

Part (b) of FIG. 6 shows, in cross section including the optic axis, a positioning section 103C in the shape of a convex arc, bulging toward a lens.

In the positioning section as described above, the smaller the width of the line contact part is, the higher the positioning precision is. However, when high precision is not required, the width of the line contact part may be larger to some extent. Therefore, when it is possible to reduce the positioning accuracy for the optical axis of the lens, the positioning section 103C shown as the second embodiment in part (b) of FIG. 6 may be used.

Next, the third embodiment will be described with reference to part (c) of FIG. 6.

As illustrated in part (c) of FIG. 6, when the surface of a lens is convex, line contact is achieved even if the positioning section is flat at a part to contact the surface of the lens. Therefore, a positioning section 103D having such a shape as shown in part (c) of FIG. 6 may be employed.

Lastly, a structure in which the lens assembly 1B illustrated in FIG. 4 is applied to a camera will be described.

Figure 7:
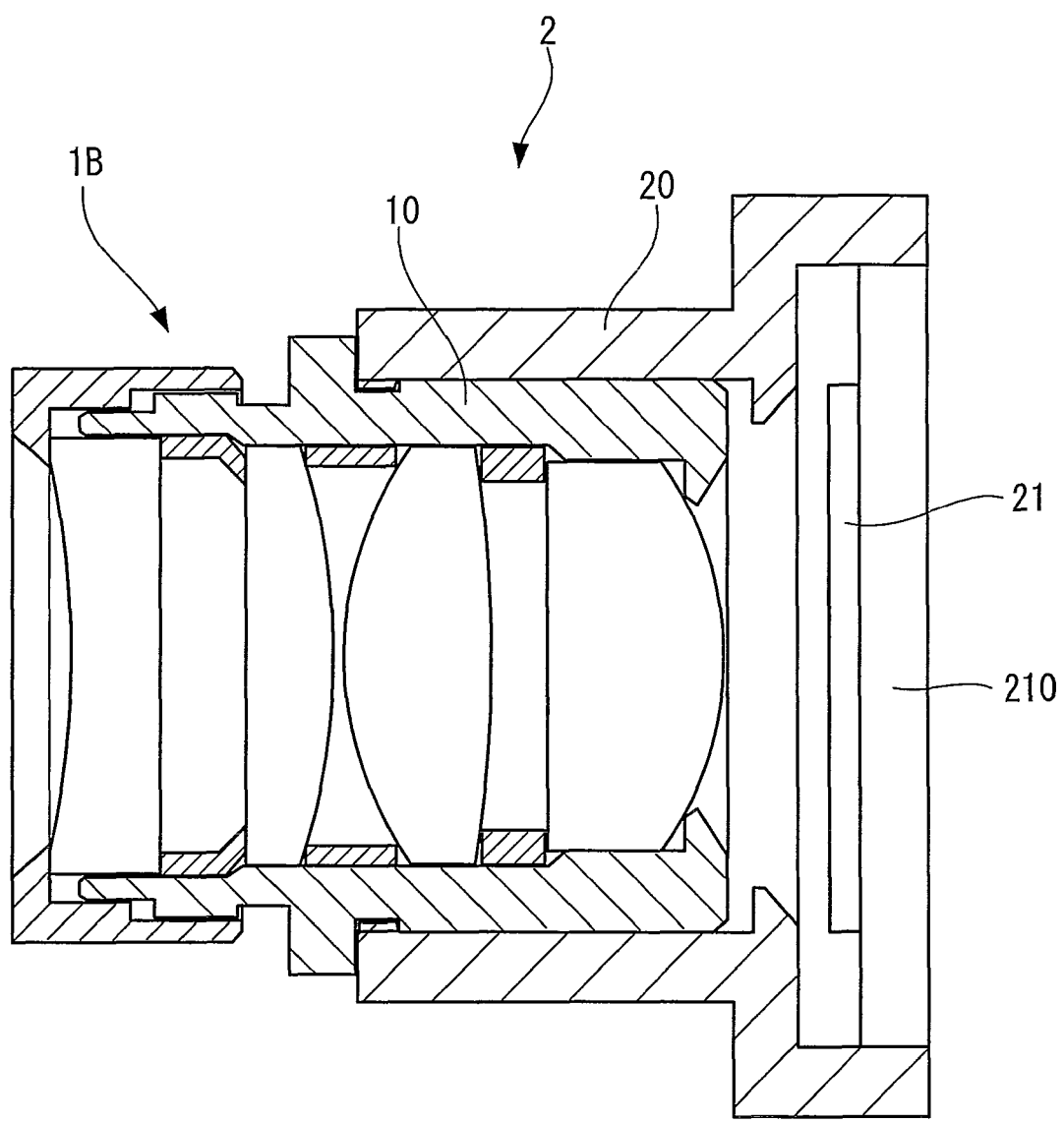
FIG. 7 is a diagram showing a camera unit provided with the lens assembly illustrated in FIG. 4.

FIG. 7 is a diagram showing a camera unit 2 provided with the lens assembly 1B illustrated in FIG. 4.

FIG. 7 is a cross-sectional view of the camera unit 2 taken along an optical axis.

The camera unit 2 shown in FIG. 7 includes: the lens assembly 1B in FIG. 4, a camera main-unit frame 20, and an imaging device 21. The imaging device 21 is implemented on an imaging-device board 210 and fixed with adhesion to the camera main-unit frame 20. An outer surface of the barrel 10 of the lens assembly 1B shown in FIG. 4 and an inner surface of the camera main-unit frame 20 are respectively provided with thread sections.

When the camera unit 2 is assembled, at first, the lens assembly 1B shown in FIG. 4 is screwed into the camera main-unit frame 20 and then, the lens assembly 1B is fixed to the camera main-unit frame 20 with adhesion. Subsequently, the imaging-device board 210 mounted with the imaging device 21 such as a CCD solid-state imaging device is bonded to the camera main-unit frame 20 with adhesion. By going through this simple procedure, the lens assembly 1B illustrated in FIG. 4 can be incorporated into the camera unit 2.

According to the present invention, there are realized a lens assembly that prevents chipping and deformation of an opening section on an image-forming side, and an image-taking apparatus incorporating such a lens assembly.

What is claimed is:

1. A lens assembly, comprising:
   a plurality of optical members forming an image-forming optical system and including a lens to be disposed on a side closest to an image-forming-side; and
   a barrel having an object-side opening, an image-forming-side opening, and a hollow part into which the plurality of optical members are inserted so that the lens is disposed on the side closest to the image-forming-side, the barrel further having:
   a positioning section that positions an image-forming-side surface of the lens by having line contact around an optical axis at a center, and
   an opening forming section that extends from the positioning section to a center of the optical axis along the image-forming-side surface of the lens and forms an edge of the image-forming-side opening.

2. The lens assembly according to claim 1, wherein the positioning section is formed to have an obtuse angle in cross section including the optical axis.

3. The lens assembly according to claim 1, wherein the positioning section is formed to be in the shape of a convex arc bulging toward the lens in cross section including the optical axis.

4. The lens assembly according to claim 1, wherein the image-forming-side surface of the lens is convex, and the positioning section has a part with a flat surface that contacts the lens.

5. The lens assembly according to claim 1, wherein the opening forming section forms the edge of the image-forming-side opening at a wedge-shaped tip with an obtuse angle in cross section including the optical axis.

6. The lens assembly according to claim 1, wherein the barrel is made of ceramic.

7. The lens assembly according to claim 1, wherein the barrel is made of porous ceramic.

8. An image-taking apparatus, comprising:
a lens assembly comprising:
   a plurality of optical members forming an image-forming optical system and including a lens to be disposed on a side closest to an image-forming-side, and
   a barrel having an object-side opening, an image-forming-side opening, and a hollow part into which the plurality of optical members are inserted so that the lens is disposed on the side closest to the image-forming-side, the barrel further having:
      a positioning section that positions an image-forming-side surface of the lens by having line contact around an optical axis at a center, and
      an opening forming section that extends from the positioning section to a center of the optical axis along the image-forming-side surface of the lens and forms an edge of the image-forming-side opening; and
an imaging device disposed at an image-forming surface of the image-forming optical system formed by the plurality of optical members of the lens assembly.

* * * * *